(12) United States Patent
Huang

(10) Patent No.: US 8,995,626 B2
(45) Date of Patent: *Mar. 31, 2015

(54) UNIFIED AND CONSISTENT USER EXPERIENCE FOR SERVER AND CLIENT-BASED SERVICES

(75) Inventor: Xuedong David Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2164 days.

This patent is subject to a terminal disclaimer.

(21) Appl. No.: 11/656,126

(22) Filed: Jan. 22, 2007

(65) Prior Publication Data
US 2008/0175358 A1    Jul. 24, 2008

(51) Int. Cl.
*H04M 1/64* (2006.01)
*H04M 1/00* (2006.01)
*H04M 1/27* (2006.01)
*H04M 1/247* (2006.01)
*H04M 1/2745* (2006.01)
*H04M 1/56* (2006.01)
(Continued)

(52) U.S. Cl.
CPC ............ *H04M 1/271* (2013.01); *H04M 1/2473* (2013.01); *H04M 1/2745* (2013.01); *H04M 1/56* (2013.01); *H04M 3/4935* (2013.01); *H04M 1/57* (2013.01); *H04M 2250/60* (2013.01)
USPC .............. 379/88.03; 379/355.02; 379/355.03; 455/419

(58) Field of Classification Search
CPC ............ H04M 3/42178; H04M 3/42204; H04M 1/274516; H04M 1/274583

USPC ............ 455/74.1, 66.1, 557, 575.1, 128, 347, 455/41.2, 419; 379/433.01, 434, 447, 379/88.13, 88.17, 355.02, 355.03, 88.03
See application file for complete search history.

(56) References Cited

U.S. PATENT DOCUMENTS

| | | | |
|---|---|---|---|
| 4,304,968 A | 12/1981 | Klausner | |
| 5,463,685 A | 10/1995 | Gaechter | |
| 6,101,473 A * | 8/2000 | Scott et al. | .................... 704/275 |

(Continued)

OTHER PUBLICATIONS

Abidogun, "Data Mining, Fraud Detection and Mobil Telecommunications: Call Pattern Analysis with Unsupervised Neural Networks", Aug. 2005.

(Continued)

*Primary Examiner* — Lisa Hashem
(74) *Attorney, Agent, or Firm* — Sandy Swain; Judy Yee; Micky Minhas

(57) ABSTRACT

Described is a technology by which a storage at a telephone device (e.g., a client telephone) is synchronized with information corresponding to actions performed at a computing device (e.g., a server) on behalf of the client. For example, the server may employ speech recognition to recognize a name or number spoken into the client telephone, and in response, dial out a corresponding telephone number for the client telephone. This action is synchronized back to the client storage so that the client's call history includes knowledge of the server's dialing action. Thereafter, an action at the telephone device that accesses the call history (e.g., for redialing or scrolling) obtains the full call history, independent of whether the telephone device or computing device performed the action. Changes made via telephone device may be similarly synchronized to the computing device, such as directly dialed calls, user-input speed dial information, and so forth.

20 Claims, 4 Drawing Sheets

(51) Int. Cl.
   *H04M 3/493* (2006.01)
   *H04M 1/57* (2006.01)

(56) References Cited

U.S. PATENT DOCUMENTS

| | | | |
|---|---|---|---|
| 6,240,171 B1 | 5/2001 | Ayukawa | |
| 6,282,435 B1 | 8/2001 | Wagner | |
| 6,337,857 B1 | 1/2002 | Booton | |
| 6,389,398 B1 * | 5/2002 | Lustgarten et al. | 704/275 |
| 6,546,262 B1 * | 4/2003 | Freadman | 455/557 |
| 6,792,082 B1 | 9/2004 | Levine | |
| 6,940,951 B2 | 9/2005 | Mahoney | |
| 6,947,770 B2 | 9/2005 | Rydbeck | |
| 6,990,321 B1 * | 1/2006 | Peters | 455/74.1 |
| 7,035,393 B1 | 4/2006 | Silver | |
| 7,068,768 B2 | 6/2006 | Barnes | |
| 7,117,445 B2 | 10/2006 | Berger | |
| 7,542,557 B2 | 6/2009 | Sun | |
| 7,711,106 B2 | 5/2010 | Likwornik | |
| 7,822,612 B1 * | 10/2010 | Goodheart | 704/275 |
| 7,890,136 B1 | 2/2011 | Fujisaki | |
| 7,894,804 B2 * | 2/2011 | Tsukamoto | 455/415 |
| 8,081,963 B2 * | 12/2011 | Aftab et al. | 455/419 |
| 8,369,903 B2 * | 2/2013 | Saitoh et al. | 455/569.2 |
| 8,442,494 B2 * | 5/2013 | Soundrapandian | 455/412.1 |
| 2002/0025832 A1 * | 2/2002 | Durian et al. | 455/556 |
| 2002/0065656 A1 * | 5/2002 | Reding et al. | 704/244 |
| 2002/0068551 A1 * | 6/2002 | Strunk et al. | 455/414 |
| 2002/0068599 A1 * | 6/2002 | Rodriguez et al. | 455/550 |
| 2002/0151334 A1 | 10/2002 | Sharma | |
| 2003/0199288 A1 * | 10/2003 | Bodnar et al. | 455/557 |
| 2004/0062235 A1 | 4/2004 | Suder | |
| 2004/0146150 A1 | 7/2004 | Barnes | |
| 2004/0230435 A1 * | 11/2004 | Douros | 704/275 |
| 2004/0235523 A1 * | 11/2004 | Schrire et al. | 455/558 |
| 2005/0032527 A1 * | 2/2005 | Sheha et al. | 455/456.1 |
| 2005/0249343 A1 | 11/2005 | Birch | |
| 2005/0272415 A1 * | 12/2005 | McConnell et al. | 455/418 |
| 2006/0078106 A1 | 4/2006 | Willcox | |
| 2006/0111058 A1 * | 5/2006 | Grant et al. | 455/127.1 |
| 2006/0135197 A1 * | 6/2006 | Jin et al. | 455/550.1 |
| 2006/0141991 A1 * | 6/2006 | House et al. | 455/412.1 |
| 2007/0121880 A1 | 5/2007 | Stillman | |
| 2007/0201681 A1 * | 8/2007 | Chen et al. | 379/355.02 |
| 2007/0275720 A1 | 11/2007 | Dei | |
| 2007/0280445 A1 * | 12/2007 | Shkedi | 379/93.23 |
| 2008/0013712 A1 | 1/2008 | Gopinath | |
| 2008/0037720 A1 * | 2/2008 | Thomson et al. | 379/88.01 |
| 2008/0233928 A1 | 9/2008 | Han | |
| 2008/0253544 A1 * | 10/2008 | Brown et al. | 379/201.12 |
| 2008/0276179 A1 * | 11/2008 | Borenstein et al. | 715/736 |
| 2008/0313277 A1 | 12/2008 | Altberg | |
| 2009/0082062 A1 * | 3/2009 | Boyaci et al. | 455/557 |
| 2009/0305679 A1 * | 12/2009 | Kim | 455/414.1 |
| 2010/0062714 A1 * | 3/2010 | Ozaki | 455/41.3 |
| 2010/0138516 A1 * | 6/2010 | Oh | 709/217 |
| 2010/0150321 A1 * | 6/2010 | Harris et al. | 379/88.02 |
| 2010/0197362 A1 * | 8/2010 | Saitoh et al. | 455/569.2 |
| 2010/0222025 A1 | 9/2010 | Bosan | |
| 2012/0084259 A1 * | 4/2012 | Welingkar et al. | 707/647 |
| 2012/0094647 A1 * | 4/2012 | Aftab et al. | 455/419 |
| 2012/0142323 A1 * | 6/2012 | Okuda | 455/415 |
| 2012/0230477 A1 * | 9/2012 | Harris et al. | 379/88.01 |
| 2013/0040706 A1 * | 2/2013 | Kim | 455/564 |
| 2013/0122969 A1 * | 5/2013 | Saitoh et al. | 455/569.2 |
| 2013/0244623 A1 * | 9/2013 | Cudak et al. | 455/414.1 |
| 2013/0304850 A1 * | 11/2013 | Mahaffey et al. | 709/217 |

OTHER PUBLICATIONS

Miyazaki, "Discussion Board System with modality variation: From Multimodality to User Freedom", Jul. 2002.

* cited by examiner

UNIFIED AND CONSISTENT USER EXPERIENCE FOR SERVER AND CLIENT-BASED SERVICES

BACKGROUND

Some contemporary types of telephones are coupled to a server, and can use services provided by the server for their operation. For example, via the server, users may issue voice commands for services, such as dialing a person directly by voice command, or parking and retrieving a call from the server. Speech recognition is performed at the server for the service.

However, there is a discrepancy between server-based actions versus client-based actions. For example, if a user issues a voice command by speaking "Call John at home" into a server-coupled telephone, the speech recognition system recognizes the command in the server and connects the caller to John's home number. While this is a highly valuable feature, the client telephone does not know anything about what action or actions the server performed. As a result, the last number the user called via voice recognition is not recorded at the client. For example, if the user thereafter presses a redial button on the client telephone, the user will be connected to the previous number the user directly dialed from that client telephone, rather than the number that was dialed by the server via voice recognition. This is not what the user expects to happen.

A similar client/server discrepancy issue occurs with other functions, such as the address book and so forth. For example, the client telephone typically records the last number dialed from the telephone, but knows nothing of voice-dialed numbers initiated from the server. As a result, the client telephone does not have an accurate list of the dialed number history. A user using the client telephone to scroll a historical list of outgoing calls will not see those dialed by the server on the user's behalf.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a storage at a telephone device (e.g., a client telephone) is synchronized with information corresponding to actions performed at a coupled computing device (e.g., a telephone device) on behalf of the telephone device. For example, the computing device may employ speech recognition to recognize a name or number spoken into the telephone device, and in response, dial out a corresponding telephone number to the public switching telephone network on behalf of the telephone device. This action is synchronized back to the telephone device so that the telephone device's storage (e.g., a call history) has knowledge of the computing device's action. In this example, a subsequent action at the telephone device that accesses the call history will have a full history that is independent of where the action that impacted that call history was performed.

Similarly, the computing device may be synchronized to reflect changes to the storage at the telephone device. This may be a change that occurs by the telephone device dialing a number without using the computing device's services, and/or by receiving data input at the telephone device, such as speed dial information input by a user.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards synchronizing server-initiated and client-initiated actions are so the user can have a more consistent telephone experience. In one example implementation, there is a described a server with various software including speech recognition software by which the user, via a client telephone device, requests the server to perform operations on behalf of the client. A typical client-server configuration may be present in PBX-type telephone systems, which may further be enhanced by voice recognition functionality at the server.

However, as will be understood, the technology described herein is not limited to PBX type telephone systems, but applies to any telephone system or systems that can execute logic. For example, a single computer system or one on a home or small business network may implement the structure and functionality described herein, e.g., to provide a telephone with the benefits of voice recognition and other technologies.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and telephony in general.

Figure 1:
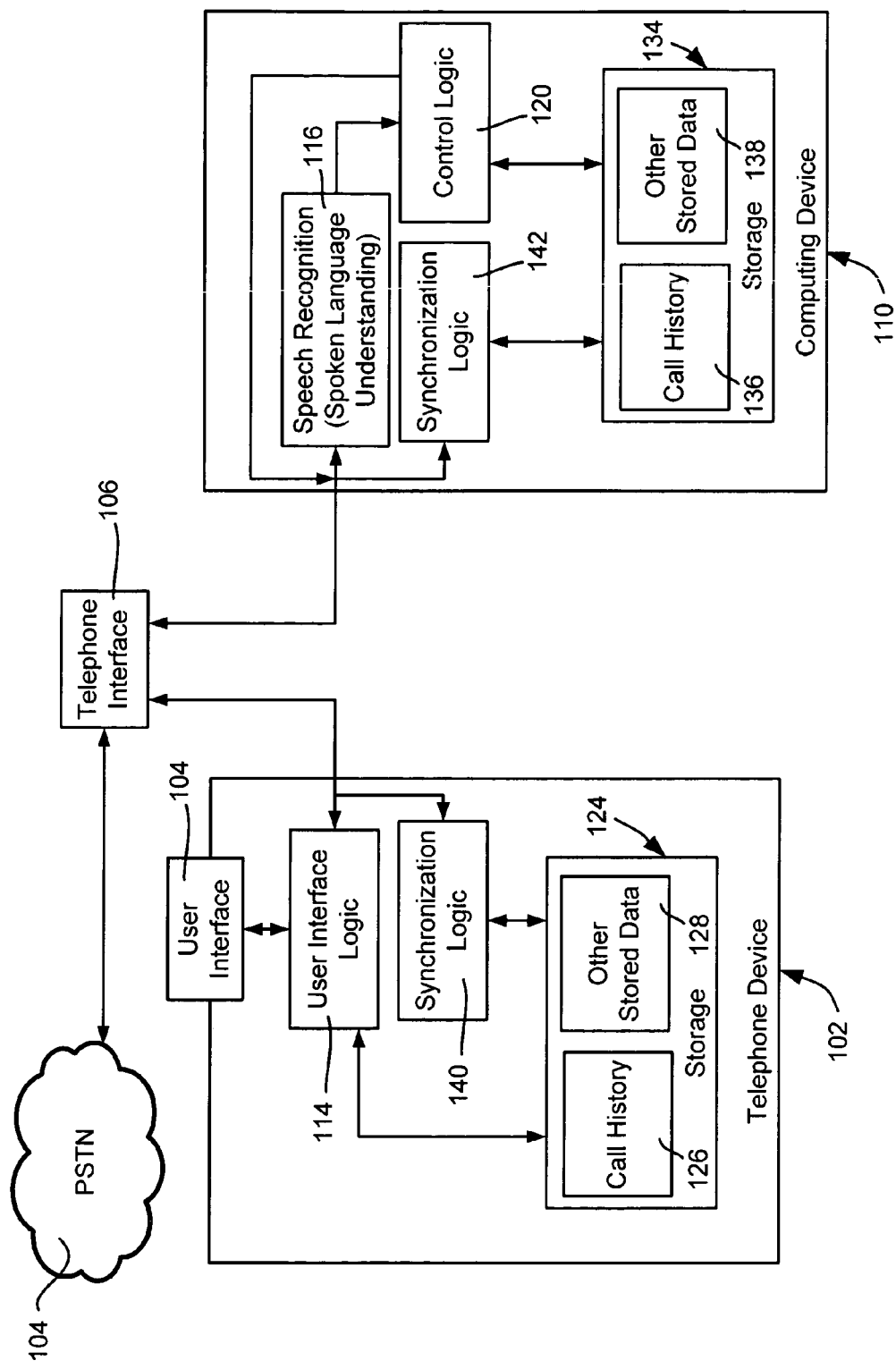
FIG. 1 shows an illustrative example of a general-purpose telephone and computing device into which various aspects of computer-assisted telephony configuration may be incorporated.

Turning to FIG. 1, there is shown a telephone device 102 (which may be a client) having a user interface 104, typically comprising at least one speaker and at least one microphone (e.g., in a headset and/or a speakerphone). The telephone user interface 104 also typically includes one or more buttons or similarly suitable actuation mechanisms.

The telephone device 102 is coupled via a telephone interface 106 (e.g., an analog telephone adapter) to the public service telephone network (PSTN) 108. The telephone device 102 is also coupled for communication with a computing device 110 (which may be a server) in some way, which in FIG. 1 is exemplified via the telephone interface 106.

In general, the telephone device operates by direct user interaction via the user interface buttons or the like. User interface logic 114 interprets button presses as commands, such as to dial or record a digit, perform a function such as scroll and select, record numbers and/or names, and so forth.

One button or other suitable actuation mechanism on the user interface 104 corresponds to a command that is interpreted to couple the telephone device 102 to the computing device 110, that is, pressing a particular button activates telephone functionality in the computing device 110 for use by the telephone device 102. In one example implementation, once the telephone device 102 is communicating with the computing device 110, the user can speak commands into a microphone of the user interface 104, which the computing device 110 recognizes as spoken commands or the like via speech recognition 116, whereby the computing device 110 performs telephone-related actions for the user. To this end, the recognized speech is handled by control logic 120 in the computing device 110 that performs the actions.

As represented in FIG. 1, the telephone device 102 includes a storage 124 (whether volatile or nonvolatile memory or some combination thereof), where a call history 126 is maintained. Other data 128 also may be stored in the storage 124, such as a set of numbers associated with speed-dial functionality. The user may, for example, scroll through the call history 126 to select a number to automatically dial, or may press a redial button which selects the most recently dialed number in the call history 126 and automatically dials that number.

Similarly, the computing device 110 contains a storage 134, which may likewise maintain a call history 136 for the telephone device 102 and other data 138. The other data 138 may include, for example, the user's contacts list, as well as information that helps the computing device with its speech recognition accuracy, e.g., statistics on the user's calling patterns that help differentiate close-sounding names. Note that the other data 138 can be the application data of another program, a database, and so forth.

As represented in FIG. 1, the telephone device 102 and computing device 110 each include synchronization logic, 140 and 142, respectively, by which computing device-initiated services are synchronized with the telephone device 102, and vice versa. For example, to provide a consistent user experience, the call history 126 and 136 of each should be the same, and some or all of the other data 128 and 138 stored on each device 102 and 110 may be likewise synchronized.

For example, via the synchronization logic 142, the last number the user dialed via voice command is communicated back to the synchronization logic 140 of the telephone device 102 for storing in the call history 126 maintained at the telephone device storage 124. Synchronization can occur at any time, e.g., during a call or just after, but should be relatively current (or on demand if the computing device 110 is virtually always available) so that telephone device-initiated actions match computing device-initiated actions before the next action occurs. For example, when a redial button is pressed on the user interface 104, via synchronization, the telephone device 102 dials out to the last number dialed, whether or not the previous way of dialing out was based on speech. To this end, the number dialed out by the computing device 110 in response to voice recognition is synchronized back to the telephone device 102 so that the telephone device storage 124 contains a full set of information in its call history 126 for redial or display scrolling. Note that when scrolling at the telephone device 102, the call history 136 at the computing device 110 can be queried on demand, so that, for example, a much larger call history list is able to be presented to the user than can be contained in the telephone device's storage 124.

Similarly, the telephone device 102 needs to synchronize its recorded actions to the computing device 110. For example, if the user programs the telephone device 102 with speed dial numbers, synchronization logic 140 may sends the speed dial information from the telephone device 102 to the computing device 110. With this information, the computing device 110 may modify its language model, for example, to improve the reliability of speech recognition, on the assumption that speed dial numbers/names likely will be more frequently desired by the user when placing calls than other numbers/names. As another operation, although the computing device 110 normally will have caller ID information and the like via the telephone interface 106, it is possible that (e.g., in a non-PBX type setup) the computing device 110 may be temporarily down, disconnected or otherwise decoupled from the telephone interface 106, in which case the telephone device 102 can synchronize such information back to the computing device when re-coupled.

Figure 2:
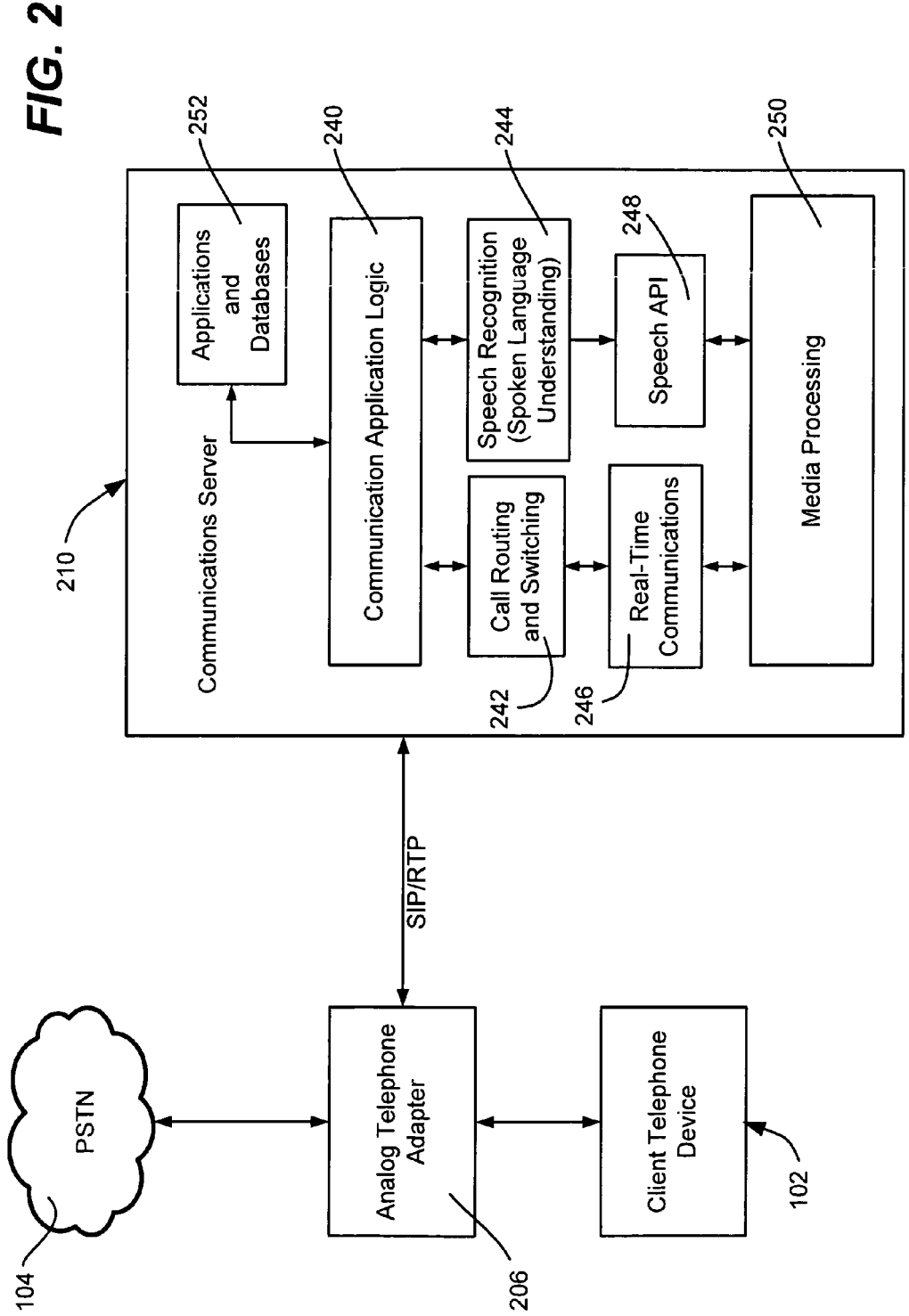
FIG. 2 is a block diagram representing an example client telephone coupled to a server having components for computer-assisted telephony.

FIG. 2 shows an example implementation in which a telephone device such as the device 102 of FIG. 1 is a client of a communications server 210. Note that the communications server 210 may be coupled in any way, and the exemplified communications server 210 includes concepts such as a directly coupled server or combination of multiple servers, and/or a set of software services provided in a network "cloud" or the like. The communications server 210 may have many such clients, and in general contains the components described in FIG. 1, including per client storage. As represented in the example of FIG. 2, the client telephone device 102 is coupled to the PSTN via an analog telephone adapter 206, which also couples the client telephone device 102 to the communications server 210. A protocol such as SIP (Session Initiation Protocol) and/or RTP (Real-Time Transport Protocol) may be used for communication.

For performing functionality like that described with reference to FIG. 1, the communications server 210 contains communication application logic 240 that is coupled to other components. For example, there is a component 242 that performs call routing and switching, and another component 244 that performs speech recognition. A real-time communications component 246 and speech API 248 interface with a media processing component 250 (e.g., containing drivers, and one or more microphones/speakers) that can communicate with a user of the client telephone device 102. Note that the communication application logic 240 is also represented as being coupled to other applications and databases 252, such as to assist in placing calls to a speech-recognized call recipient.

Figure 3:
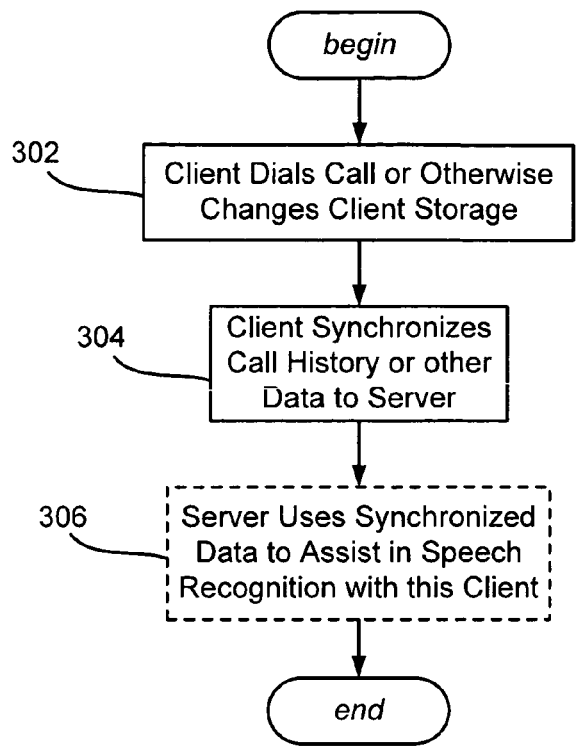
FIG. 3 is a flow diagram representing example steps taken by a client telephone to synchronize its call history with a server.
Figure 4:
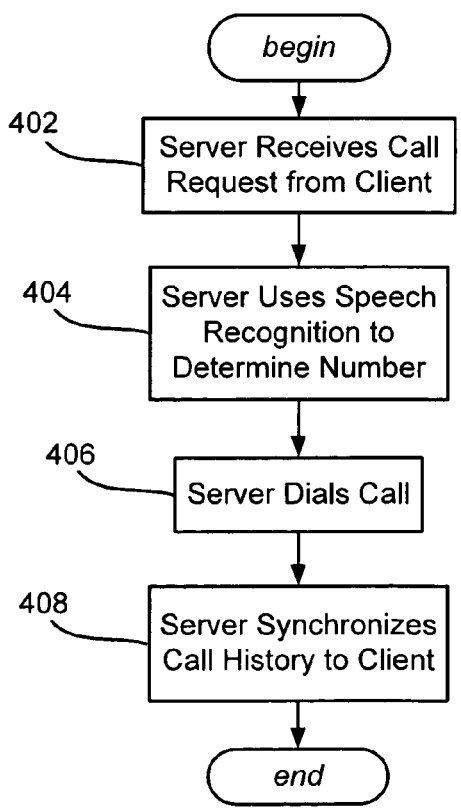
FIG. 4 is a flow diagram representing example steps taken by a server to synchronize its telephone-related actions with a client telephone

FIGS. 3 and 4 summarize the synchronization operations, beginning at step 302 where the client device has its storage changed in some way. For example, the client device may dial a call, or may have its storage otherwise reprogrammed in some way, such as to enter a speed-dial name or number (or a set thereof). Step 304 represents the client-to-server synchronization, which may comprise sending only the changes (deltas) or a full synchronization. Note that as described above, the synchronization may take place any time that the client is communicating with the server, but the server should be updated as often as needed to avoid having a client command misinterpreted. For example, if the server is configured to recognize a redial request, and a user of the client speaks "redial" into the client device, the server needs to be able to dial the last number dialed independent of which method the client used (e.g., direct dial or voice recognition) to dial the last number.

Step 306 is an optional step (as represented by the dashed box) in which the server may use the data synchronized from the client. For example, the server may use the changed data as statistical information in helping with future speech recognition related to this client. Alternatively, the server may be configured to recognize a command such as "redial" or the like, whereby the server needs to have the call history up to date to correctly perform such an operation from the perspective of the requesting user.

FIG. 4 summarizes the server-to-client synchronization operations, beginning at step 402 where the server receives a spoken call request from the client. For example, a user of the client device may verbally request a person or number be dialed. Step 404 represents the server recognizing the speech, whereby the call is dialed at step 406.

Step 408 represents the server-to-client synchronization of the call history, which may comprise sending only the changes (deltas) or a full synchronization. Note that as described above, the synchronization may take place any time that the client is communicating with the server, but the client should be updated as often as needed to avoid having a client command misinterpreted. For example, if a user of the client presses a redial button or scrolls on the client device, the client needs to have the full history, independent of which method was used (e.g., a client action or server voice recognition) to change that history.

Although not explicitly shown in FIG. 4, as part of synchronization, the server may also provide any relevant data to the client that has changed at the server. For example, a new contact or speed dial input via an application at the server may be sent to the client for use in the client's local storage.

Exemplary Operating Environment

Figure 5:
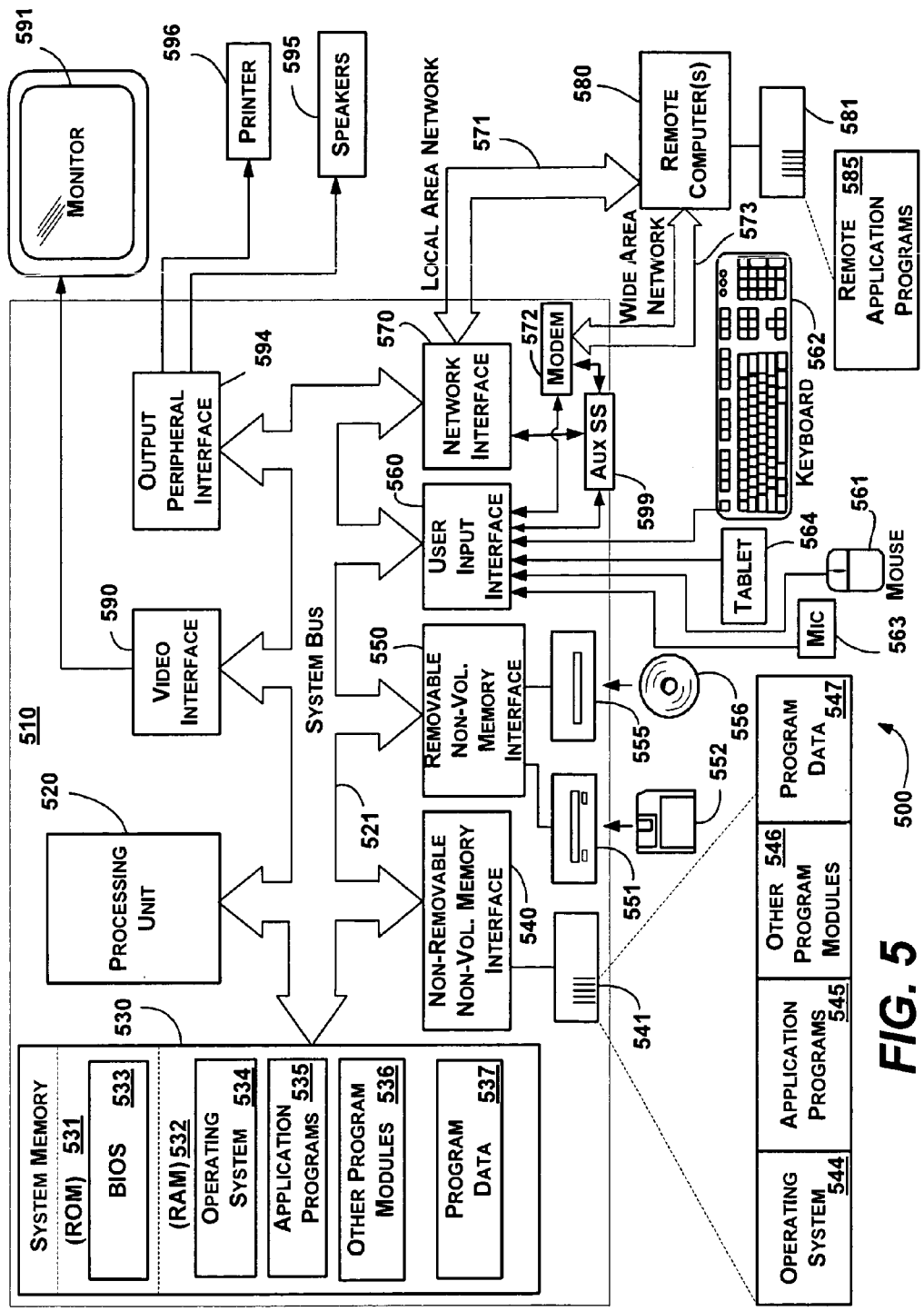
FIG. 5 shows an illustrative example of a general-purpose network computing environment into which various aspects of the present invention may be incorporated.

FIG. 5 illustrates an example of a suitable computing system environment 500 on which the computing device 110 of FIG. 1 (e.g., the server 210 of FIG. 2) may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tapes magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a telephony environment in which a telephone device is coupled to a computing device, a method comprising:
    performing an action by the computing device on behalf of the telephone device in response to a request from a user via the telephone device; and
    synchronizing, by the computing device, a storage of the telephone device with information that indicates the performed action, where the synchronized storage includes information regarding computing device-performed actions and telephone device-performed actions, where the request comprises the user speaking a phrase into the telephone device, where the performed action comprises the computing device recognizing the spoken phrase and generating a number that corresponds to the spoken phrase and then placing a call using the generated number on behalf of the telephone device, where the information includes the generated number, and where the synchronizing comprises updating a call history stored on the telephone device to include the generated number as if the placed call was made from the telephone device.

2. The method of claim 1 wherein performing the action at the computing device comprises outputting data corresponding to a number that is spoken by the user via the telephone device.

3. The method of claim 2 wherein performing the action includes the computing device recognizing speech received by the computing device from the telephone device.

4. The method of claim 2 wherein the synchronizing the storage of the telephone device comprises providing information to the telephone device that represents the number spoken by the user via the telephone device.

5. The method of claim 4 where the information of the synchronized storage represents a portion of call history maintained on and by the telephone device.

6. The method of claim 5 where the number represented by the information of the synchronized storage is available via the call history to the telephone device for scrolling through the call history.

7. The method of claim 5 where the number represented by the information of the synchronized storage is available via the call history to the telephone device for a redial operation by the telephone device.

8. In a telephony environment, a system that includes a computing device and at least one program module that are together configured for performing actions comprising:
   performing an action by the computing device on behalf of the telephone device in response to a request from a user via the telephone device; and
   synchronizing, by the computing device, a storage of the telephone device with information that indicates the performed action, where the synchronized storage includes information regarding computing device-performed actions and telephone device-performed actions, where the request comprises the user speaking a phrase into the telephone device, where the performed action comprises the computing device recognizing the spoken phrase and generating a number that corresponds to the spoken phrase and then placing a call using the generated number on behalf of the telephone device, where the information includes the generated number, and where the synchronizing comprises updating a call history stored on the telephone device to include the generated number as if the placed call was made from the telephone device.

9. The system of claim 8 where performing the action at the computing device comprises outputting data corresponding to a number that is spoken by the user via the telephone device.

10. The system of claim 9 where performing the action includes the computing device recognizing speech received by the computing device from the telephone device.

11. The system of claim 9 where the synchronizing the storage of the telephone device comprises providing information to the telephone device that represents the number spoken by the user via the telephone device.

12. The system of claim 11 where the information of the synchronized storage represents a portion of call history maintained on and by the telephone device.

13. The system of claim 12 where the number represented by the information of the synchronized storage is available via the call history to the telephone device for scrolling through the call history.

14. At least one computer storage media storing computer-executable instructions that, when executed by a computing device, cause the computing device to perform actions comprising:
   performing, by the computing device in response to a request from a user via a telephone device, an action on behalf of the telephone device; and
   synchronizing, by the computing device, a storage of the telephone device with information that indicates the performed action, where the synchronized storage includes information regarding computing device-performed actions and telephone device-performed actions, where the request comprises the user speaking a phrase into the telephone device, where the performed action comprises the computing device recognizing the spoken phrase and generating a number that corresponds to the spoken phrase and then placing a call using the generated number on behalf of the telephone device, where the information includes the generated number, and where the synchronizing comprises updating a call history stored on the telephone device to include the generated number as if the placed call was made from the telephone device.

15. The at least one computer storage media of claim 14 where performing the action at the computing device comprises outputting data corresponding to a number that is spoken by the user via the telephone device.

16. The at least one computer storage media of claim 15 where performing the action includes the computing device recognizing speech received by the computing device from the telephone device.

17. The at least one computer storage media of claim 15 where the synchronizing the storage of the telephone device comprises providing information to the telephone device that represents the number spoken by the user via the telephone device.

18. The at least one computer storage media of claim 17 where the information of the synchronized storage represents a portion of call history maintained on and by the telephone device.

19. The at least one computer storage media of claim 18 where the number represented by the information of the synchronized storage is available via the call history to the telephone device for scrolling through the call history.

20. The at least one computer storage media of claim 18 where the number represented by the information of the synchronized storage is available via the call history to the telephone device for a redial operation by the telephone device.

* * * * *